| United States Patent [19] | [11] Patent Number: 4,980,230 |
| Saito et al. | [45] Date of Patent: Dec. 25, 1990 |

[54] MAGNETIC RECORDING MEDIUM

[75] Inventors: Shinji Saito; Hiroshi Ogawa, both of Kanagawa, Japan

[73] Assignee: Fuji Photo Film Co., Ltd., Kanagawa, Japan

[21] Appl. No.: 246,828

[22] Filed: Sep. 20, 1988

[30] Foreign Application Priority Data

Sep. 21, 1987 [JP] Japan ................... 62-236871

[51] Int. Cl.$^5$ ............................. G11B 23/00
[52] U.S. Cl. .................... 428/329; 427/131; 428/425.9; 428/694; 428/900
[58] Field of Search ............ 428/329, 694, 900, 425.9; 427/131

[56] References Cited

U.S. PATENT DOCUMENTS

| 4,246,316 | 1/1981 | Aonuma et al. | 427/131 |
| 4,259,392 | 3/1981 | Suzuki et al. | 428/694 |
| 4,503,120 | 3/1985 | Yamauchi et al. | 428/694 |
| 4,643,941 | 2/1987 | Miyoshi et al. | 428/694 |
| 4,851,289 | 7/1989 | Ogawa et al. | 428/694 |
| 4,857,388 | 8/1989 | Ogawa et al. | 428/694 |
| 4,865,924 | 9/1909 | Saito et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium is described, comprising a nonmagnetic support having provided thereon a first magnetic layer and a second magnetic layer in this order, each containing ferromagnetic particles, and the first and second magnetic layers each comprising at least one polyurethane resin as a binder, where the number average molecular weight of the at least one polyurethane resin contained in the first magnetic layer is 4/5 or less of that of the at least one polyurethane resin contained in the second magnetic layer.

4 Claims, No Drawings

MAGNETIC RECORDING MEDIUM

FIELD OF THE INVENTION

This invention relates to a magnetic recording medium comprising a non-magnetic support and a magnetic layer, more particularly, it relates to a magnetic recording medium having at least two magnetic layers.

BACKGROUND OF THE INVENTION

A magnetic recording medium is widely used as an audio tape, a video tape or a floppy disk. Certain magnetic recording media are fundamentally composed of a non-magnetic support having thereon a magnetic layer containing ferromagnetic particles dispersed in a binder.

High performance characteristics such as electromagnetic characteristics, running durability or running property are required for a magnetic recording medium. That is, higher ability for reproducing original sound is required for an audio tape for recording and reproducing music. Excellent electromagnetic characteristics are required for a video tape to ensure ability for reproducing original images.

It is known that the electromagnetic characteristics of a magnetic recording medium comprising ferromagnetic particles remarkably vary depending upon the dispersion state of the ferromagnetic particles in the magnetic layer. That is, even though ferromagnetic particles having excellent magnetic properties are used to improve electromagnetic characteristics, the excellent magnetic properties do not yield an improvement in electromagnetic characteristics if the dispersion state thereof is poor.

One approach to improving the dispersibility of ferromagnetic particles in a magnetic layer is long term mixing, kneading and dispersing in preparing the magnetic coating composition used for a magnetic layer. However, there is the problem of decrease the magnetic properties of ferromagnetic particles if mixing, kneading and dispersing is conducted for too long a term.

Recently, it was proposed that a polar group should be introduced into the resin component used to form the binder so that the binder in the magnetic layer has good affinity with the ferromagnetic particles.

For example, it is disclosed in JP-A-59-5424 that resins having a predetermined polar group such as a metal sulfonate group should be used in the binder in an amount of 50 wt % or more. The term "JP-A" as used herein means "an unexamined published Japanese patent application". As disclosed above, good dispersibility of ferromagnetic metal particles in a magnetic layer can be secured using resins having a polar group as a binder, and accordingly, electromagnetic characteristics of a magnetic recording medium using such a magnetic layer can be improved However, a magnetic layer using a polar group containing resin as a binder tends to be hard. Such a hard magnetic layer is likely to adhere incompletely to the support, and the smoothness of the magnetic layer tends to be deteriorated due to poor moldability during calendering.

On the other hand, in view of the molecular weight of resins used as binders, it is known that among resins having the above described polar groups, resins having a lower molecular weight are preferred, because dispersibility of ferromagnetic metal particles is better and electromagnetic characteristics are improved. However, when resins having a low molecular weight are used as a binder in a magnetic layer, the layer tends to be fragile. A fragile magnetic layer has insufficient strength and surface hardness, and tends to have poor running properties and durability.

Accordingly, even though electromagnetic characteristics are fairly good, durability is not satisfactorily excellent.

SUMMARY OF THE INVENTION

An object of this invention is to provide a magnetic recording medium such as an audio tape, video tape or the like having excellent electromagnetic characteristics and improved durability.

This invention relates to a magnetic recording medium comprising a non-magnetic support having provided thereon a first magnetic layer and a second magnetic layer in this order each containing ferromagnetic particles, and the first and second magnetic layers each comprising at least one polyurethane resins as a binder, where the number average molecular weight of the polyurethane type resins contained in the first magnetic layer is 4/5 or less of that of the at least one polyurethane resin contained in the second magnetic layer.

DETAILED DESCRIPTION OF THE INVENTION

Thus, this invention relates to a magnetic recording medium having at least two magnetic layers where the under layer (the first magnetic layer) uses a binder composed of at least one polyurethane type resin having a low number average molecular weight and the upper layer (the second magnetic layer) uses a binder composed of polyurethane type resins having a high number average molecular weight which is within a predetermined molecular weight range.

In the above described under layer, the ferromagnetic particles have good dispersibility and the surface of the magnetic layer is extremely smooth. Accordingly, a magnetic recording medium having good electromagnetic characteristics in a low or high wave length region, improved moldability during calendering and also good durability and practical property can be obtained by providing an upper layer having good durability on the under layer having a smooth surface.

The magnetic recording medium of this invention is essentially composed of a non-magnetic support having thereon at least two magnetic layers containing ferromagnetic particles dispersed in a binder.

The non-magnetic supports for use in this invention are conventional and include films or sheets composed of polyesters such as polyethylene terephthalate (PET) or polyethylene naphthalate, polyolefins such as polypropylene, cellulose derivatives such as cellulose triacetate or cellulose diacetate, vinyl type resins such as polyvinyl chloride or polyvinylidene chloride, synthetic resins such as polycarbonate, polyamide, polyamidoimide or polyimide resins; non-magnetic metal foils such as aluminum or copper; metal foils such as stainless steel foil; and paper or ceramic sheets.

These supports have thickness of generally from 2.5 to 100 μm, and preferably from 3 to 70 μm.

The binder of this invention, which is contained in the first and second magnetic layers, is composed of polyurethane type resins, and the number average molecular weight of polyurethane type resins(s) contained in the first magnetic layer is 4/5 or less that of the polyurethane type resin contained in the second magnetic layer. Further, the weight percentage of the polyurethane type resins per ferromagnetic particles contained in the first magnetic layer is preferably 5/4 or more of that of the polyurethane type resin(s) contained in the second magnetic layer.

The number average molecular weight of the polyurethane type resin(s) contained in the second magnetic layer is preferably from 2,000 to 200,000, more preferably from 10,000 to 100,000. When the molecular weight thereof is less than 2,000, still characteristic (i.e., durability in the case a video tape is in the still mode) is deteriorated, and when the molecular weight exceeds 200,000, the dispersibility of ferromagnetic particles is deteriorated. The number average molecular weight of the polyurethane type resin(s) contained in the first magnetic layer is generally from 1/10 to 4/5 of that of the polyurethane type resin(s) contained in the second magnetic layer, preferably from 1/10 to 3/5 and more preferably from 1/10 to ½.

The dispersibility of ferromagnetic particles is excellent and the surface of a magnetic layer is made extremely smooth by adjusting the number average molecular weight of the polyurethane type resin(s) contained in the first magnetic layer to 4/5 or less of that of the polyurethane type resin(s) contained in the second magnetic layer. Accordingly, by providing the second magnetic layer on the first magnetic layer, excellent surface smoothness of the composite magnetic layers can be obtained. Also, by using a polyurethane type resin(s) having a lower number average molecular weight in the first magnetic layer, moldability while calendering of the composite magnetic layers is improved and electromagnetic characteristics are excellent.

Regarding the content of polyurethane type resin(s) per ferromagnetic particles, it is preferred that the weight percentage of polyurethane type resin(s) per ferromagnetic particles contained in the first magnetic layer is 5/4 or more of that of the polyurethane resin per the ferromagnetic particles contained in the second magnetic layer, and particularly 3/2 to 5/1 of that. By adjusting the weight percentage to the range as described above, the moldability while calendering of the composite magnetic layers is improved and, thus, the adhesion of magnetic layers to the support is improved.

The polyurethane type resins for use in this invention are not particularly limited. Particularly, the polyurethane type resins as described in U.S. Pat. Nos. 4,152,485 and 4,521,486 can be used. For example, polyester type polyurethane resins, polyether type polyurethane resins, polyurethane type resins having introduced therein a polar group such as hydroxyl group, a carboxyl group, a phosphoric acid group, a phosphoric acid ester group, $-SO_3Na$ or $-SO_2Na$, and polycarbonate polyurethane resins can be used.

Binder resins for use in each magnetic layer may be used in addition to the above polyurethane type resins and they are not particularly limited. The binder resins include vinyl chloride type copolymer (e.g., copolymers of vinyl chloride and vinyl acetate, copolymers of vinyl chloride, vinyl acetate and vinyl alcohol, copolymers of vinyl chloride, vinyl acetate and acrylic acid, copolymers of vinyl chloride and vinylidene chloride, copolymers of vinyl chloride and acrylonitrile, and copolymers of ethylene and vinyl acetate), cellulose derivatives such as a nitrocellulose resins, acrylic resins, polyvinyl acetal resins, polyvinyl butyral resins, epoxy resins and phenoxy resins. Vinyl chloride type copolymers having a polar group such as a hydroxyl group, a carboxyl group, an epoxy group, a sulfonic acid metal salt group, a phosphoric acid group or a phosphoric acid ester group are particularly preferred.

The above copolymers and resins can be used alone or in combination.

The polyurethane type resin(s) contained in the first magnetic layer is contained in an amount of preferably 10 wt % or more and more preferably from 20 to 80 wt % in the binder and that contained in the second magnetic layer is contained in amount of preferably 5 wt % or more and more preferably from 10 to 90 wt % in the binder. The effect of this invention cannot be obtained if the contents of the polyurethane type resin(s) is less than the above ranges.

When a hardening agent is used, a polyisocyanate compound is generally used. The polyisocyanate compounds are generally selected from those polyurethane type resins conventionally used as hardening agents for polyurethane type resins. The polyisocyanate compounds include a reaction product of tolylenediisocyanate and 1 mole of trimethylol propane (e.g., "Desmodule L-75", manufactured by Bayer Co., Ltd.), a reaction product of 3 moles of a diisocyanate such as xylene diisocyanate or hexamethylene diisocyanate, a Biuret adduct product of 3 moles of hexamethylene diisocyanate, an isocyanurate compound of 5 moles of tolylene diisocyanate, an isocyanurate adduct product of 3 moles of tolylene diisocyanate and 2 moles of hexamethylene diisocyanate, and polymer of isophorondiisocyanate and diphenylmethane diisocyanate. The amount of the polyisocyanate compound used is preferably from ½ to 4 times as large as the amount of the polyurethane type resins used.

When hardening treatment is conducted with electron beam irradiation as described in JP-A-59-58623 and JP-A-59-71130, compounds having a reactive double bond (e.g., urethane acrylate) can be used.

In this invention, it is preferred that resins having softness, such as the polyurethane type resins of this invention, and resins having high hardness, such as the vinyl chloride type copolymer having the above described polar group, be used in combination as resin components.

With respect to the vinyl chloride type copolymers, the number average molecular weight of the vinyl chloride type copolymer contained in the first magnetic layer preferably is different from that contained in the second magnetic layer. That is, it is particularly preferred that the degree of polymerization of the copolymer of the vinyl chloride type contained in the first magnetic layer is lower by 20 or more than that contained in the second magnetic layer. This invention becomes most effective under the above conditions.

A higher content of binder of binders is/are used in case when ferromagnetic metal particle having a low hardness are used as ferromagnetic particles than in the case when $\gamma$-$Fe_2O_3$ having high hardness is used. In this instance, the soft resins such as the polyurethane type resins are generally used in a larger amount.

The binder tends to soften with increasing amounts of the polyurethane type resins. Therefore, the hardness of the binder can be maintained by increasing the amount of a hardening agent such as a polyisocyanate compound(s).

In the case polyurethane type resins are used as a resin component and polyisocyanate-compounds are used as a hardening agent, the mixing weight ratio of the polyurethane type resins/polyisocyanate compounds is generally from 1/0.8 to ½ (preferably form 1/1 to 1/1.5). Even though ferromagnetic metal particles having low hardness are used, the softening tendency of the binder due to the use of polyurethane type resins can be effectively prevented by limiting the mixing ratio as described above.

The total weight of the resin component and hardening agents is preferably from 5 to 40 parts by weight, and more preferably from 10 to 20 parts by weight, per 100 parts by weight of the ferromagnetic particles in the layer.

Ferromagnetic particles for use in this invention include ferromagnetic particles of metal oxides such as $\gamma$-$Fe_2O_3$, ferromagnetic particles of metal-doped metal oxides such as co-containing $\gamma$-$Fe_2O_3$, and ferromagnetic metal particles containing ferromagnetic metals such as iron, cobalt or nickel.

When ferromagnetic metal particles are used, the ferromagnetic metal particles containing iron, cobalt or nickel preferably have a specific surfaces area(B.E.T. method) of generally 42 $m^2/g$ or higher, and preferably 45 $m^2/g$ or higher.

Such ferromagnetic metal particles have a metal content of 75 wt % or more, and 80 wt % or more of the metal content is at least one kind of ferromagnetic metal or alloy, (e.g., Fe, Co, Ni, Fe-Co, Fe-Ni, Co-Ni, Co-Ni-Fe, and 20 wt % or less of the metal content is another components (e.g., Al, Si, S, Sc, Ti, V, Cr, Mn, Cu, Y, Mo, Rh, Pd, Ag, Sn, Sb, B, Ba, Ta, W, Re, Au, Hg, Pb, P, La, Ce, Pr, Nd, Te, Bi). The above described ferromagnetic metal can include a slight amount of water, hydroxides or oxides.

The method for preparing such ferromagnetic particles is known and conventional methods (for example, methods as described in *Chemistry and Industry of Magnetic Substance*, Tekumato K. K.) can be used in this invention.

The shape of the ferromagnetic particles is not particularly limited, and ferromagnetic particles which are acicular, granular, dice-like, ellipsoidal and plate-like can be used. Acicular ferromagnetic particles are particularly preferred. The acicular ferromagnetic particles have an acicular ratio (long axis/short axis) of preferably from 3 to 20 and particularly preferably from 4 to 7.

Further, the average length in the short axis of the ferromagnetic particles which are preferably used in the first magnetic layer is from 300 to 500 Å (Angstrom), and the avere length in the short axis of the ferromagnetic particles which are preferably used in the second magnetic layer is from 200 to 350 Å.

The above described resin components, hardening agents and ferromagnetic particles are conventionally mixed, kneaded and dispersed with a conventional solvent (e.g., methyl ethyl ketone, dioxane, cyclohexanone, ethyl acetate) to prepare a magnetic coating composition.

In addition to the above components, generally used additives such as abrasive agents (e.g., $\alpha$-$Al_2O_3$, $Cr_2O_3$), antistatic agents (e.g., carbon black), lubricating agents (e.g., fatty acids, fatty acid esters, silicon oils) or dispersing agents and fillers may be added into the magnetic coating composition. Particularly, the above abrasive agents preferably have an average particle size of 0.5 $\mu$m or less and the above antistatic agents preferably have an average particle size of 150 m$\mu$ or less.

The thus prepared magnetic coating composition is coated on a non-magnetic support in a conventional manner. For example, the composition for forming the magnetic layer such as the resin(s) for the first magnetic layer, ferromagnetic particles, and, if desired, abrasive agents and hardening agents or the like, are mixed, kneaded and dispersed with a solvent to prepare a magnetic coating composition for the first magnetic layer. Also, a magnetic coating composition for the second magnetic layer is prepared by the same manner as described above. Using a conventional coating method for coating a magnetic coating composition on a nonmagnetic support, the first magnetic layer is formed and then the second magnetic layer is formed thereon.

One coating method is a conventional method using, for example, a reverse roll.

The dry thickness of the first magnetic layer is preferably from 0.5 to 8 $\mu$m and the dry thickness of the second magnetic layer is preferably from 0.1 to 2 $\mu$m.

The dry thickness of a magnetic layer (i.e. the first and second magnetic layer) is generally from 0.5 to 10 $\mu$m and preferably from 2 to 6 $\mu$m.

A backing layer may be provided on the surface of the non-magnetic support opposite the magnetic layer. A backing layer is generally a layer coated on the surface of the non-magnetic support opposite the magnetic layer with a conventional coating composition for backing layers containing granular components such as abrasive agents or antistatic agents and binders dispersed in an organic solvent. A method for preparing the backing layer used in the present invention is described in U.S. Pat. No. 4,567,063.

An adhesive layer may be provided on both the surfaces of the non-magnetic support before the magnetic layer and the backing layer are provided, if desired.

A magnetic layer is generally subjected to magnetic orientation to orientate the ferromagnetic particles contained in the magnetic layer and then dried.

The dried magnetic layer is then subjected to a surface smoothing treatment, using, for example, super calendering rolls. Voids formed due to removal of solvent upon drying are removed by providing a surface smoothing treatment, thereby improving the packing density of the ferromagnetic particles in the magnetic layer, and, thus, a magnetic recording medium having excellent electromagnetic characteristics is obtained.

The obtained magnetic layers are subjected to hardening treatment and are the cut to the desired shape.

Cutting is done in a conventional manner using a slitter and the like.

The magnetic recording medium having under and upper layers of this invention has been described, and as long as two magnetic layers as defined in this invention are included, three or more layers may be used.

The present invention will now be illustrated more specifically by the following Examples and Comparative Examples. In each Example and Comparative Example, all parts are by weight, unless otherwise mentioned.

EXAMPLE 1

| Magnetic coating composition for first magnetic layer: | |
|---|---|
| Co—Y$Fe_2O_3$ (average length in the short axis: 350 Å A (Angstrom), average length in the long axis: 0.20 $\mu$m, Hc: 650 Oe, $\sigma$s: 74 emu/g, S BET (specific surface area): 35 $m^2/g$) | 100 parts |

| -continued | |
|---|---|
| Copolymer of vinyl chloride, vinyl acetate and maleic anhydride (Composition ratio 87/8/5, degree of polymerization:400) | 8 parts |
| Polyester polyurethane resin (Number average molecular weight (Mn): $1.6 \times 10^4$) | 8 parts |
| α-alumina (average particle size: 0.2 μm) | 3 parts |
| Butyl stearate | 1 part |
| Stearic acid | 2 part |
| Butyl acetate | 300 parts |
| Coating composition for second magnetic layer: | |
| Co—YFe$_2$O$_3$ (average length in the short axis: 290 Å A, average length in the long axis: 0.18 μm Hc: 750 Oe, σs: 74 emu/g S BET (specific surface area): 45 m$^2$/g) | 100 parts |
| Copolymer of vinyl chloride, vinyl acetate and maleic anhydride (Composition ratio 87/8/5, degree of polymerization:400) | 8 parts |
| Polyester polyurethane resin (Number average molecular weight (Mn): $2.0 \times 10^4$) | 8 parts |
| α-alumina (average particle size: 0.2 μm) | 3 parts |
| Butyl stearate | 1 part |
| Stearic acid | 2 part |
| Butyl acetate | 300 parts |

Each of the above compositions was mixed, kneaded and dispersed in a sand mill, and the resulting dispersion was filtered using a filter having an average pore size of 1 μm and collected to obtain a magnetic coating composition for the first and the second magnetic layers.

The thus obtained coating composition for forming a first magnetic layer was coated using a reverse roll on a polyethylene terephthalate support having a thickness of 15 μm, travelling at a rate of 60 m/min. so that the dry thickness was 3.0 μm. Then the coating composition for forming a second magnetic layer was coated thereon using a reverse roll in a dry thickness of 1.0 μm, the magnetic layers were subjected to orientation using magnets having a magnetic force of 3000 gauss, while they were wet, and then dried and were subjected to a super calendering treatment, and slit to a ½inch-width to prepare a video tape.

EXAMPLE 2

By following the same procedure as in Example 1, a video tape was prepared except that a polyester polyurethane resin having a lower molecular weight (number average molecular weight (Mn): $1.2 \times 10^4$) was used instead of the polyester polyurethane resin (number average molecular weight (Mn): $1.6 \times 10^4$) used in the coating composition for forming a first magnetic layer in EXAMPLE 1.

EXAMPLE 3

By following the same procedure as in Example 1, a video tape was prepared except that a polyester polyurethane resin having a lower molecular weight (number average molecular weight (Mn): $0.8 \times 10^4$) was used instead of the polyester polyurethane resin (number average molecular weight (Mn): $1.6 \times 10^4$) in the coating composition for forming the first magnetic layer.

EXAMPLE 4

By following the same procedure as in Example 1, a video tape was prepared except that a polyester polyurethane resin having a lower molecular weight (number average molecular weight (Mn): $0.4 \times 10^4$) was used instead of the polyester polyurethane resin (number average molecular weight (Mn): $1.6 \times 10^4$) used in the coating composition for forming the first magnetic layer.

EXAMPLE 5

By following the same procedure as in Example 2, a video tape was prepared except that a polyester polyurethane having a higher molecular weight (number average molecular weight (Mn): $6.0 \times 10^4$) was used instead of the polyester polyurethane resin (number average molecular weight (Mn): $2.0 \times 10^4$) used in the coating composition for forming the second magnetic layer in Example 2.

EXAMPLE 6

By following the same procedure as in Example 1, a video tape was prepared except that a polyester polyurethane resin having a lower molecular weight (number average molecular weight (Mn): $0.6 \times 10^4$) was used instead of the polyester polyurethane resin (number average molecular weight (Mn): $1.6 \times 10^4$) used in the coating composition for forming the first magnetic layer and a polyester polyurethane resin having a lower molecular weight (number average molecular weight (Mn): $1.0 \times 10^4$) was used instead of the polyester polyurethane resin (number average molecular weight (Mn): $2.0 \times 10^4$) used in the coating composition for forming the second magnetic layer.

EXAMPLE 7

By following the same procedure as in Example 2, a video tape was prepared except that 10 parts of the same polyester polyurethane resin (number average molecular weight (Mn): $1.2 \times 10^4$) was used instead of 8 parts thereof as were used in the coating composition for forming the first magnetic layer.

EXAMPLE 8

By following the same procedure as in Example 2, a video tape was prepared except that 12 parts of the same polyester polyurethane resin (number average molecular weight (Mn): $1.2 \times 10^4$) was used instead of 8 parts of the same resin as used in the coating composition for forming the first magnetic layer.

EXAMPLE 9

By following the same procedure as in Example 2, a video tape was prepared except that 16 parts instead of 8 parts of the same polyester polyurethane resin (number average molecular weight (Mn): $1.2 \times 10^4$) used in the coating composition for forming a first magnetic layer was used.

EXAMPLE 10

By following the same procedure as in Example 1, a video tape was prepared except that a copolymer of vinyl chloride, vinyl acetate and maleic anhydride having a lower degree of polymerization of 300 was used instead of the copolymer of vinyl chloride, vinyl acetate and maleic anhydride having a degree of copolymerization of 400 used in the coating composition for forming the first magnetic layer.

EXAMPLE 11

By following the same procedure as in Example 1, a video tape was prepared except that a copolymer of vinyl chloride, vinyl acetate and maleic anhydride having a lower degree of polymerization of 250 was used instead of the copolymer of vinyl chloride, vinyl acetate and maleic anhydride having a degree of polymerization of 400 as was used in the coating composition for forming a first magnetic layer.

COMPARATIVE EXAMPLE 1

By following the same procedure as in Example 1, a video tape was prepared except that a polyester polyurethane resin (number average molecular weight (Mn): $2.0 \times 10^4$) was used instead of the polyester polyurethane resin (number average molecular weight (Mn): $1.6 \times 10^4$) used in the coating composition for forming the first magnetic layer.

COMPARATIVE EXAMPLE 2

By following the same procedure as in Example 1, a video tape was prepared except that a polyester polyurethane resin (number average molecular weight (Mn): $6.0 \times 10^4$) was used instead of the polyester polyurethane (average molecular weight (Mn): $1.2 \times 10^4$) used in the coating composition for forming the first magnetic layer in Example 5.

The number average molecular weight (Mn) and the additive amounts of polyester polyurethane used in each layer of the video cassette tapes obtained in the Examples and Comparative Examples are shown in Table 1, and the results of measuring the physical properties of each tape in the following manner are shown in Table 2.

MEASUREMENT (1) Surface roughness (Ra)

The surface roughness of a magnetic layer of a video tape was measured at a cut off value of 0.25 mm using a three-dimensional roughness measurement device (SE-3AK manufactured by Kosaka Kenkyusho, Co., Ltd.) according to JIS B 0601.

(2) Maximum residual flux density (Bm)

The maximum residual flux density was measured using a sample oscillating flux meter (VSM-III, manufactured by Toei Kogyo Co., Ltd.).

(3) Y·S/N (signal to noise ratio of brilliance signal of video)

The S/N of luminance signals at 4 MHz was measured, assuming that the output level of the video tape in Comparative Example 1 is 0 dB.

(4) Still life

Signals on each video tape were reproduced to the still mode and the period of time for S/N to decrease by 6 dB was measured. Output was measured using an output level measurement apparatus "NV-870 HD type" (manufactured by Matsushita Electric Industrial Co., Ltd.).

TABLE 1

| | Polyurethane in the first layer | | Polyurethane in the second layer | |
|---|---|---|---|---|
| | Mn | Parts by weight | Mn | Parts by weight |
| Example | | | | |
| 1 | $1.6 \times 10^4$ | 8.0 | $2.0 \times 10^4$ | 8.0 |
| 2 | $1.2 \times 10^4$ | 8.0 | $2.0 \times 10^4$ | 8.0 |
| 3 | $0.8 \times 10^4$ | 8.0 | $2.0 \times 10^4$ | 8.0 |
| 4 | $0.4 \times 10^4$ | 8.0 | $2.0 \times 10^4$ | 8.0 |
| 5 | $1.2 \times 10^4$ | 8.0 | $6.0 \times 10^4$ | 8.0 |
| 6 | $0.6 \times 10^4$ | 8.0 | $1.0 \times 10^4$ | 8.0 |
| 7 | $1.2 \times 10^4$ | 10.0 | $2.0 \times 10^4$ | 8.0 |
| 8 | $1.2 \times 10^4$ | 12.0 | $2.0 \times 10^4$ | 8.0 |
| 9 | $1.2 \times 10^4$ | 16.0 | $2.0 \times 10^4$ | 8.0 |
| 10 | $1.6 \times 10^4$ | 8.0 | $2.0 \times 10^4$ | 8.0 |
| 11 | $1.6 \times 10^4$ | 8.0 | $2.0 \times 10^4$ | 8.0 |
| Comparative Example | | | | |
| 1 | $2.0 \times 10^4$ | 8.0 | $2.0 \times 10^4$ | 8.0 |
| 2 | $6.0 \times 10^4$ | 8.0 | $6.0 \times 10^4$ | 8.0 |

TABLE 2

| | Ra (μm) | Bm (G) | Y·S/N (dB) | Still life (min.) |
|---|---|---|---|---|
| Example | | | | |
| 1 | 0.011 | 1860 | 0.5 | 100 |
| 2 | 0.010 | 1900 | 0.7 | 100 |
| 3 | 0.009 | 1920 | 0.8 | 100 |
| 4 | 0.007 | 1980 | 1.0 | 100 |
| 5 | 0.013 | 1880 | 0.2 | 120 |
| 6 | 0.008 | 1940 | 0.9 | 100 |
| 7 | 0.009 | 1920 | 0.8 | 100 |
| 8 | 0.008 | 1930 | 0.9 | 100 |
| 9 | 0.007 | 1950 | 1.0 | 100 |
| 10 | 0.009 | 1900 | 0.8 | 100 |
| 11 | 0.007 | 1960 | 1.0 | 100 |
| Comparative Example | | | | |
| 1 | 0.015 | 1820 | 0.0 | 100 |
| 2 | 0.018 | 1740 | −0.6 | 120 |

In Table 1, in Examples 1 to 4, the same polyester polyurethane resin (number average molecular weight (Mn): $2.0 \times 10^4$) for the second magnetic layer was used, and the number average molecular weight (Mn) of the polyester polyurethane resin for the first magnetic layer was decreased from $1.6 \times 10^4$ (Example 1) and the effect of the decrease was checked. It was clearly seen that surface roughness (Ra), Bm, Y.S/N were improved by decreasing the molecular weight of the polyester polyurethane resin used for the first magnetic layer and that electromagnetic characteristics were also improved.

Example 5 illustrates the case where the difference of number average molecular weight of the polyurethane resin used in the first magnetic layer and the second magnetic layer is high, and Example 6 illustrate the case when the difference is low contrary to Example 5. In Example 5, using a polyester polyurethane resin having a high number average molecular weight in the second layer, surface roughness (Ra), Bm and Y.S/N are slightly deteriorated compared to the other Examples, but still life is excellent.

Examples 7 to 9 illustrate the case where the polyurethane resin content per ferromagnetic particles in the first magnetic layer is increased. As the content is increased, surface roughness (Ra), Bm and Y.S/N are slightly improved and electromagnetic characteristics are improved.

Examples 10 and 11 illustrate the case where the molecular weight (degree of polymerization) of the copolymer of vinyl chloride, vinyl acetate and maleic anhydride (used in combination with the polyurethane resins) was decreased to see the effect of the decrease. It is clearly seen that surface roughness (Ra), Bm and Y.S/N were slightly improved and electromagnetic characteristics were improved.

On the other hand, in Comparative Examples 1 and 2 using the polyurethane resins having the same number average molecular weight in the first and the second magnetic layer, it is clearly seen that while still life is as good as that in the Examples, surface roughness (Ra), Bm and Y.S/N, which are related to electromagnetic characteristics, were inferior.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a first magnetic layer and a second magnetic layer in this order, each containing ferromagnetic particles, the first and second magnetic layers each comprising at least one polyurethane resin as a binder, wherein the number average molecular weight of the at least one polyurethane resin contained in the first magnetic layer is 4/5 or less that of the at least one polyurethane resin contained in the second magnetic layer, the number average molecular weight of the at least one polyurethane type resin contained in the second magnetic layer is in the range of from 2,000 to 200,000, and wherein said polyurethane resin contained in the first magnetic layer is present in an amount of 10 wt % or more in the binder and said polyurethane resin contained in the second magnetic layer is present in an amount of 5 wt % or more in the binder.

2. The magnetic recording medium as claimed in claim 1, wherein the weight percentage of the at least one polyurethane type resin per ferromagnetic particles contained in the first magnetic layer is 5/4 or more of that of the at least one polyurethane type resin per the ferromagnetic particles contained in the second magnetic layer.

3. The magnetic recording medium as claimed in claim 1, wherein said binder contains at least one vinyl chloride type copolymer in addition to said at least one polyurethane type resin.

4. The magnetic recording medium as claimed in claim 1, wherein both said first and said second magnetic layers contain not only the at least one polyurethane type resin but also a vinyl chloride type copolymer as a binder, and the degree of polymerization of said vinyl chloride type copolymer contained in the first magnetic layer is lower by 20 or more than that of said vinyl chloride type copolymer contained in the second magnetic layer.

* * * * *